United States Patent [19]

Ouchi

[11] Patent Number: 5,216,231
[45] Date of Patent: Jun. 1, 1993

[54] SELF-SCANNING CODE READING DEVICE

[75] Inventor: Junichi Ouchi, Furukawa, Japan

[73] Assignee: Alps Electric Co., Ltd., Tokyo, Japan

[21] Appl. No.: 745,989

[22] Filed: Aug. 8, 1991

Related U.S. Application Data

[63] Continuation of Ser. No. 316,343, Feb. 27, 1989, abandoned.

[30] Foreign Application Priority Data

| May 13, 1988 | [JP] | Japan | 63-114872 |
| Jun. 26, 1988 | [JP] | Japan | 63-127155 |
| Jun. 7, 1988 | [JP] | Japan | 63-138537 |
| Jun. 7, 1988 | [JP] | Japan | 63-138538 |
| Jun. 7, 1988 | [JP] | Japan | 63-138539 |
| Jun. 7, 1988 | [JP] | Japan | 63-138540 |

[51] Int. Cl.⁵ ............................................. G06K 7/10
[52] U.S. Cl. ............................................. 235/463; 235/466
[58] Field of Search ............... 235/454, 462, 463, 466, 235/470

[56] References Cited

U.S. PATENT DOCUMENTS

| 4,012,716 | 3/1977 | Herrin | 235/463 |
| 4,431,912 | 2/1984 | Dickson et al. | 235/466 |
| 4,500,776 | 2/1985 | Laser | 235/454 |
| 4,533,825 | 8/1985 | Yamada | 235/463 |
| 4,634,850 | 1/1987 | Pierce et al. | 235/462 |
| 4,713,785 | 12/1987 | Antonelli et al. | 235/463 |
| 4,746,789 | 5/1988 | Gieles et al. | 235/462 |

Primary Examiner—Robert A. Weinhardt
Attorney, Agent, or Firm—Guy W. Shoup; Edward C. Kwok

[57] ABSTRACT

A code reading device, which converts a bar code displayed on a medium into electric signals by means of a photo-electric converter and outputs them after having decoded them into data, which can be dealt with by an information processing device, wherein there are disposed two memories for storing data decoded, respectively, at the present time and data decoded at the last time and a comparator for comparing the data stored in these memories, and decoded data are transmitted to the information processing device, only when the two data differ from each other so that the amount of outputted data is reduced.

13 Claims, 8 Drawing Sheets

FIG. 2
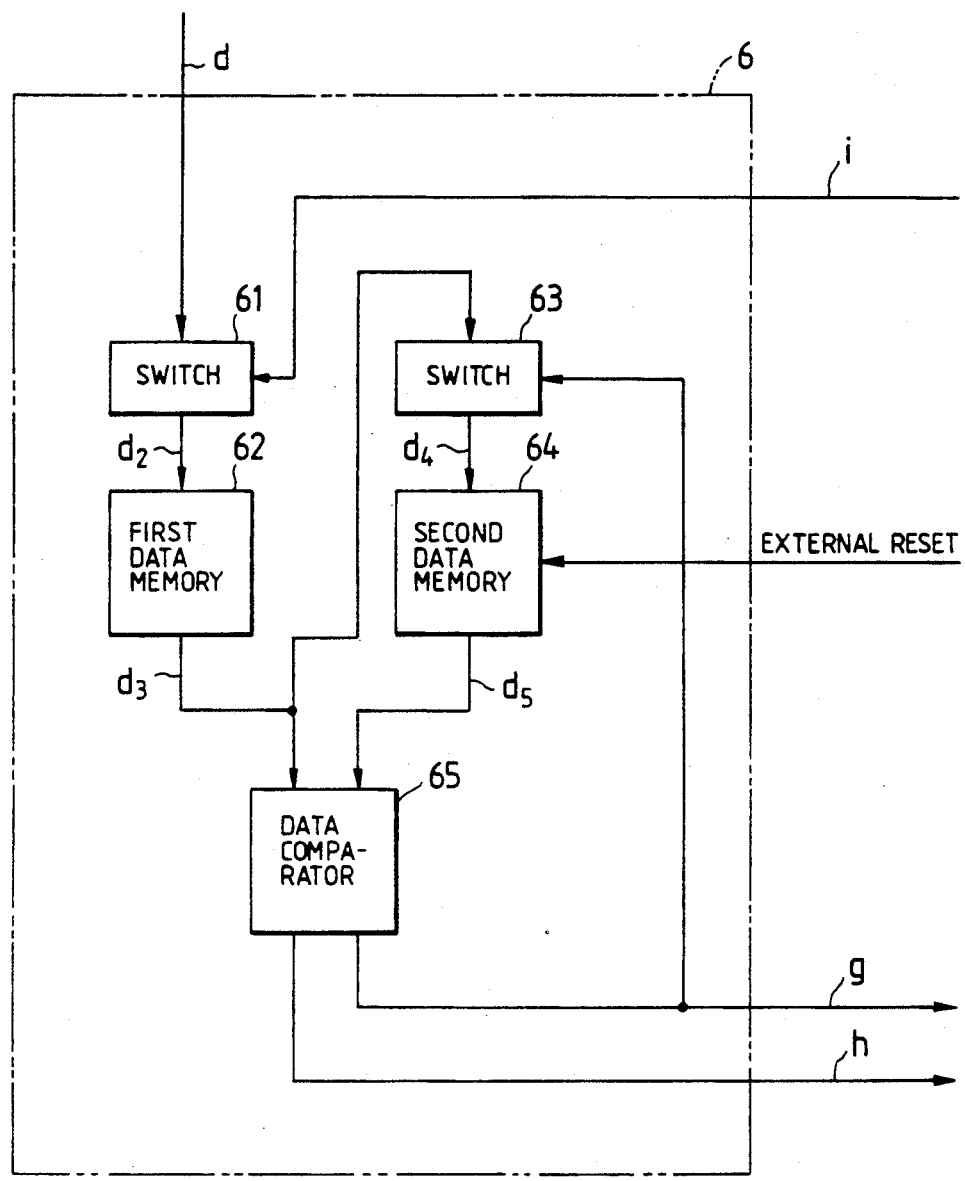
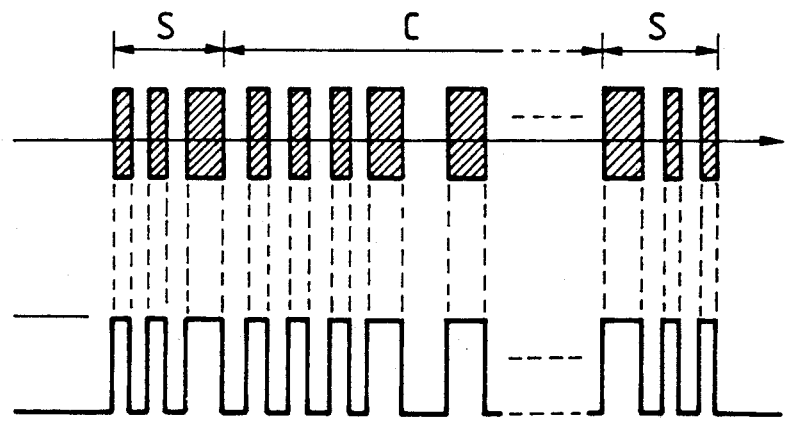
FIG. 3a
FIG. 3b

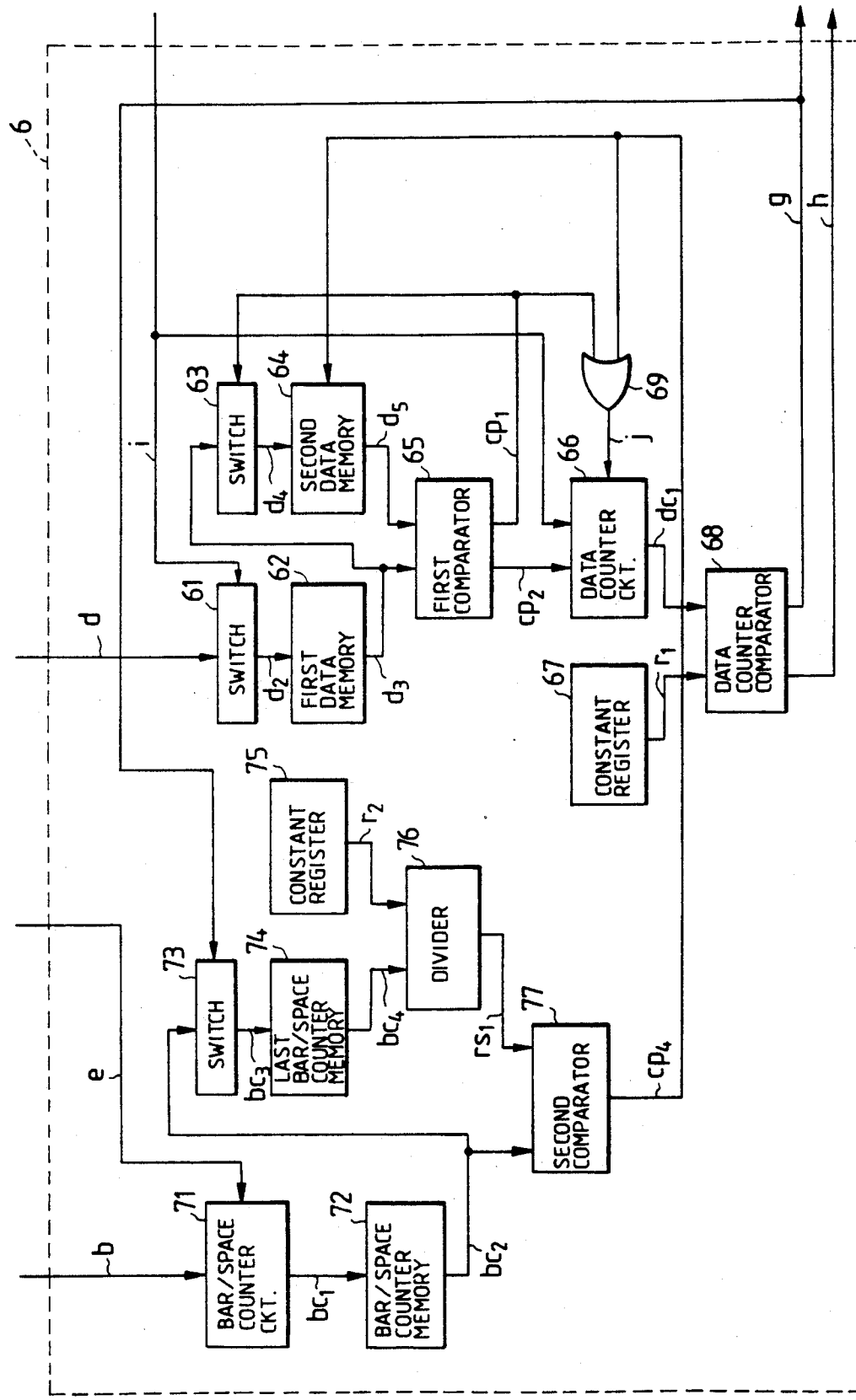

SELF-SCANNING CODE READING DEVICE

This application is a continuation of application Ser. No. 07/316,343, filed Feb. 27, 1989, now abandoned.

FIELD OF THE INVENTION

This invention relates to a code reading device which transforms bar codes displayed on a medium into electric signals by means of a photo-electric converter and outputs, after decoding, data which can be dealt with in an information processing device. In particular, this invention relates to a code reading device capable of reducing the amount of its output data by using a self scanning type photo-electric converter in order to decrease the load of the information processing device.

Further, this invention relates to a code reading device which transforms bar codes displayed on a medium into electric signals by means of a photo-electric converter and outputs, after decoding, data which can be dealt with in an information processing device. In particular, this invention relates to a code reading device capable of reducing the amount of its output data by using a self scanning type photo-electric converter in order to decrease the load of the information processing device and at the same time dealing with bar codes located at different positions, distinguishing them, even if they are the same bar code.

Still further, this invention relates to a code reading device which transforms bar codes displayed on a medium into electric signals by means of a photo-electric converter and outputs, after decoding, data which can be dealt with in an information processing device. In particular, this invention relates to a code reading device capable of reducing the amount of its output data by using a self scanning type photo-electric converter in order to decrease the load of the information processing device receiving the output data, and at the same time reading bar codes displayed at different positions and having the same structure, while distinguishing them automatically.

BACKGROUND OF THE INVENTION

As means for inputting data in an information processing device such as an electronic computer, etc., there is known a bar code input system. The bar code input system has been widely used for sales management using separate data, data input for function check or operation/management of various devices for industrial or home use, etc.

The standard of such a bar code is explained in detail e.g. in Japanese Industrial Standard JIS 89550-1978; "Transistor" Technical Separate Volume, published by CQ Publishing Co., Jul. 1, 1984; Sensor Interfacing, No. 4, pp. 179-199 "Fabrication of Bar Codes"; etc.

FIGS. 3a and 3b show a scheme for decoding a bar code and the read-out waveform thereof. FIG. 3a shows symbols of a displayed bar code and FIG. 3b indicates a read-out waveform obtained by scanning the bar code indicated in FIG. 3a in the direction indicated by the arrow with a photo-electric converter. S in FIG. 3a shows a start code which is used for setting the initial state of the code reading device or as a reference for judging bar/space. C indicates a message code which indicates information (message) represented by this bar code. FIG. 3a shows that the code can also be read in the direction opposite to that indicated by the arrow.

The code reading device counts the number of clock signals corresponding to the interval between adjacent edges in the waveform in FIG. 3b which has two levels "H" and "L", obtained by transforming the bar code into electric signals using e.g. a self scanning type photo-electric converter. The information C is decoded from the count value thus obtained, and output to an information processing device in the form of binary data.

Further, since the bar code input system not only shortens considerably the time for data input by means of a keyboard, etc., it simplifies the input operation, and reduces the number of input mistakes. Because the photo-electric converter serving as an input device has no mechanically moving parts, the field of application becomes greater day by day.

This bar code input system is widely used e.g. for sales management whose principal data are the kind, the price, the number of sales, the sales territory, etc. for particular merchandises; presetting programs for VTR; control of microwave oven, room cooler, etc.; various information management by using various sorts of data; and operation and function check of various devices for industrial and home use.

As discussed above, the code reading device reading out a code such as shown in FIG. 3a counts the number of clock signals corresponding to the interval between adjacent edges in the waveform indicated in FIG. 3b. In the code reading device using the scanning type photo-electric converter, a bar code is scanned and decoded several tens to several hundreds of times to obtain a high reading out probability.

OBJECT OF THE INVENTION

In the code reading device using the scanning type photo-electric converter, a bar code is scanned and decoded a number of times (several tens to several hundreds) in order to increase the reading out probability. Such repetitive readings increase the load unnecessarily at the information processing device side because the same code, even though decoded correctly, is sent out multiple times, such that the resources of the information processing device are wasted.

Consequently, a first technical problem to be solved by this invention is to provide a code reading device so constructed that the load of decoded data for the information processing device is reduced.

Secondly, the bar code used in the bar code input system is apt to be misread because of stuck dirt. In addition, the reflected light by clear bars may decrease because of poor printing; the width of bar may vary; or void within dark bars or spot within clear bars may exist. These are causes of erroneous readings. Further, the code reading device used in the bar code input system is unstable just after switch-on of the power supply. The incident angle may fluctuate due to incorrect operation which may also give rise to an erroneous reading.

Therefore, in this kind of code reading devices, it is necessary to increase the probability of reading codes while avoiding the wasting of resources of the information processing device and yet, at the same time, correctly reading out and decoding the bar code.

Furthermore, where data tables of e.g. the kind, the price, the number of sales, clients, etc. of merchandises are prepared by using bar codes and analysis of the results of operation and drafting of business plan are effected by reading out and dealing with these data tables, etc., i.e. in order to deal with many sorts of information or for the sake of convenience, the processing may be effected by using bar codes, the same encoding scheme may be used to encode different information as data. In such a case, this kind of bar codes has the same encoding scheme but different information can be arranged e.g. in the longitudinal direction of the data tables and the information is recognized on the basis of position and order.

In such a case, if it is possible to recognize information of bar codes located in different positions of the data tables (e.g. different positions in line in the longitudinal direction) and using the same encoding scheme in the code reading device, the processing is executed with high efficiency and convenience.

SUMMARY OF THE INVENTION

First means according to this invention is characterized in that means for storing data decoded at the present time and data decoded at the last preceding time is disposed on the output side of the decoding portion and the data decoded at the present time are transmitted to an information processing device, only when they are different from the data decoded at the last time.

Second means according to this invention is characterized in that an output control portion is disposed on the output side of the decoding portion which output control portion comprises a first data memory for storing data decoded at the present time; a second data memory for storing data decoded at the last time; a comparator for comparing the data stored in the first data memory with those stored in the second data memory; and means for transmitting the data stored in the first data memory as decoded data to an information processing device when the two data in the comparator are the same more than a predetermined number of times.

This means according to this invention is characterized in that an output control portion is disposed on the output side of the decoding portion which output control portion comprises a first data memory for storing data decoded at the present time; a second data memory for storing data decoded at the last time; a first comparator for comparing the data stored in the first data memory with those stored in the second data memory; and a second comparator detecting that a ratio of the number of bars and/or spaces to a predetermined number is smaller than a certain value, wherein, when the data stored in the first data memory differ from those stored in the second data memory according to the result of the comparison, the data stored in the first data memory are transmitted as decoded data to an information processing device, and when the result of the comparison in the second comparator is smaller than a certain ratio, the relevant bar code is transmitted as another piece of information.

Fourth means according to this invention is characterized in that an output control portion is disposed on the output side of the decoding portion which output control portion comprises a first data memory for storing data decoded at the present time; a second data memory for storing data decoded at the last time; a first comparator for comparing the data stored in the first data memory with those stored in the second data memory; and a second comparator detecting that a ratio of the number of bars and/or spaces to a predetermined number is smaller than a certain value, wherein, when the two data in the comparator are the same more than a predetermined number of times, the data stored in the first data memory are transmitted as decoded data to an information processing device and when the result of the comparison in the second comparator is smaller than a certain ratio, the relevant bar code is transmitted as another piece of information.

Fifth means according to this invention is characterized in that an output control portion is disposed on the output side of the decoding portion which output control portion comprises a first data memory for storing data decoded at the present time; a second data memory for storing data decoded at the last time; a comparator for comparing the data stored in the first data memory with those stored in the second data memory; and means for transmitting the data stored in the first data memory as decoded data to an information processing device when the number of times the two data in the comparator successively are the same reaches a predetermined value.

Sixth means according to this invention is characterized in that an output control portion is disposed on the output side of the decoding portion which output control portion comprises a first data memory for storing data decoded at the present time; a second data memory for storing data decoded at the last time; a first comparator for comparing the data stored in the first data memory with those stored in the second data memory; a second comparator detecting that a ratio of the number of bars and/or spaces to a predetermined number is smaller than a certain value; and an output control portion provided with means for transmitting the data stored in the first data memory as decoded data to an information processing device when the number of times the two data in the comparator successively are the same reaches a predetermined value, and transmitting the relevant bar code as another information to be dealt with when the result of the comparison in the second comparator is smaller than a certain ratio.

The first means described above works as follows.

In the code reading device in which the bar code is scanned a number of times to be read out, because data of the same code are not transmitted, no data processing is effected after the code has been correctly decoded. Hence, the load of the information processing device is remarkably reduced while maintaining the read out probability.

The second means described above works as follows.

When the self scanning type photo-electric converting portion begins to read out the bar code displayed on the medium, the edge detecting portion and the counting portion start to work on the basis of the output signal of this self scanning type photo-electric converting portion and the bar code is decoded by the decoding portion on the basis of the output signals of the edge detecting portion and the counting portion.

In this way, the data decoded by the decoding portion is inputted to the output control portion. The data decoded at the present time are stored in the first data memory in the output control portion and the data decoded at the last preceding time are stored in the second data memory. Further, a comparator is disposed in the output control portion which comparator compares the data stored in the first data memory with those stored in the second data memory. When the number of times the two data are the same reaches a predetermined value, the data stored in the first data memory are transmitted as decoded data to the information processing device.

In this way, the code reading device according to this invention can effect a reading out operation with a high reading out probability without erroneous decoding and transmit the decoded data obtained by decoding to the information processing device so that the load of the information processing device is reduced.

The third means described above works as follows.

When the self scanning type photo-electric converting portion begins to read out the bar code displayed on the medium, the edge detecting portion and the counting portion start to work on the basis of the output signal of this self scanning type photo-electric converting portion and the bar code is decoded by the decoding portion on the basis of the output signals of the edge detecting portion and the counting portion.

The data decoded by the decoding portion is inputted to the output control portion. The data decoded at the present time are stored in the first data memory in the output control portion and the data decoded at the last preceding time are stored in the second data memory. Further, the first comparator disposed in the output control portion compares the data stored in the first data memory with the data stored in the second data memory and the second comparator disposed in the output control portion compares the number of bars and/or spaces with the predetermined value.

When, in the comparison by means of the first comparator, the data stored in the first data memory are not the same as those stored in the second data memory, the data stored in the first data memory are transmitted as decoded data to the information processing device. In addition, when the result of the comparison by means of the second comparator is smaller than the predetermined value, the bar code is transmitted separately as another information even if the bar code has the same structure.

In this way, according to this invention even for a bar code having the same structure, if the display position is different, it is transmitted separately as another information and a high precision reading operation is effected. At the same time, the decoded data thus obtained are supplied to the information processing device so that the load of the information processing device is reduced.

The fourth means described above works as follows.

When the self scanning type photo-electric converting portion begins to read out the bar code displayed on the medium, the edge detecting portion and the counting portion start to work on the basis of the output signal of this self scanning type photo-electric converting portion and the bar code is decoded by the decoding portion on the basis of the output signals of the edge detecting portion and the counting portion.

The data decoded by the decoding portion is inputted in the output control portion. The data decoded at the present time are stored in the first data memory in the output control portion and the data decoded at the last time are stored in the second data memory. Further, the first comparator disposed in the output control portion compares the data stored in the first data memory with the data stored in the second data memory and the second comparator disposed in the output control portion compares the number of bars and/or spaces with the predetermined value.

When, in the comparison by means of the first comparator, the data stored in the first data memory are the same as the data stored in the second data memory a predetermined number of times (predetermined value), the data stored in the first data memory are transmitted as decoded data to the information processing device. In addition, when the result of the comparison by means of the second comparator is smaller than the predetermined ratio, even if the bar code has the same structure, the object to be read out (the relevant bar code) is dealt with as another information.

In this way, according to this invention, a reading operation of high reliability is effected with a high reading out probability and without erroneous decoding, while distinguishing bar codes at different positions, and at the same time the decoded data thus obtained are supplied to the information processing device so that the load of the information processing device is reduced.

The fifth means described above works as follows.

When the self scanning type photo-electric converting portion begins to read out the bar code displayed on the medium, the edge detecting portion and the counting portion start to work on the basis of the output signal of this self scanning type photo-electric converting portion and the bar code is decoded by the decoding portion on the basis of the output signals of the edge detecting portion and the counting portion.

The data decoded by the decoding portion is inputted in the output control portion. The data decoded at the present time are stored in the first data memory in the output control portion and the data decoded at the last time are stored in the second data memory. Further, the comparator is disposed in the output control portion. This comparator compares the data stored in the first data memory with the data stored in the second data memory and when the number of times the two data are successively the same reaches the predetermined value, the data stored in the first data memory are transmitted as decoded data in the information processing device.

In this way, the fifth means according to this invention reads out the bar code with a high precision under stable reading out conditions and transmits the decoded data thus obtained in the decoding portion to the information processing device so that the load of the information processing device is reduced.

The sixth means described above works as follows.

When the self scanning type photo-electric converting portion begins to read out the bar code displayed on the medium, the edge detecting portion and the counting portion start to work on the basis of the output signal of this self scanning type photo-electric converting portion and the bar code is decoded by the decoding portion on the basis of the output signals of the edge detecting portion and the counting portion.

The data decoded by the decoding portion is inputted in the output control portion. The data decoded at the present time are stored in the first data memory in the output control portion and the data decoded at the last time are stored in the second data memory. Further, the first comparator disposed in the output control portion compares the data stored in the first data memory with the data stored in the second data memory and the second comparator compares the number of bars and/or spaces with the predetermined value.

When, in the comparison by means of the first comparator, the number of times the data stored in the first data memory are successively the same as the data stored in the second data memory reaches the predetermined value, the data stored in the first data memory are transmitted as decoded data to the information processing device. In addition, when the result of the comparison by means of the second comparator is smaller than the predetermined value, the bar code is automatically distinguished and transmitted separately as another information, even if the bar code has the same structure.

In this way, according to this invention, even for a bar code having the same structure, if the display position is different, it is transmitted separately as another information and a high precision reading operation is effected. At the same time, the decoded data thus obtained are supplied to the information processing device so that the load of the information processing device is reduced.

BRIEF DESCRIPTION OF THE DRAWINGS

FIG. 2 is a block diagram of the principal part of the device indicated in FIG. 1 including the first means of this invention;

FIG. 3a and 3b indicate, respectively, a bar code and a waveform obtained by reading out the bar code;

FIG. 9 is a block diagram of the principal part of the device shown in FIG. 5 including the sixth means of this invention.

DETAILED DESCRIPTION

Hereinbelow, an embodiment of this invention including the first means will be explained in detail, referring to FIGS. 1, 2, 3a and 3b.

Figure 1:
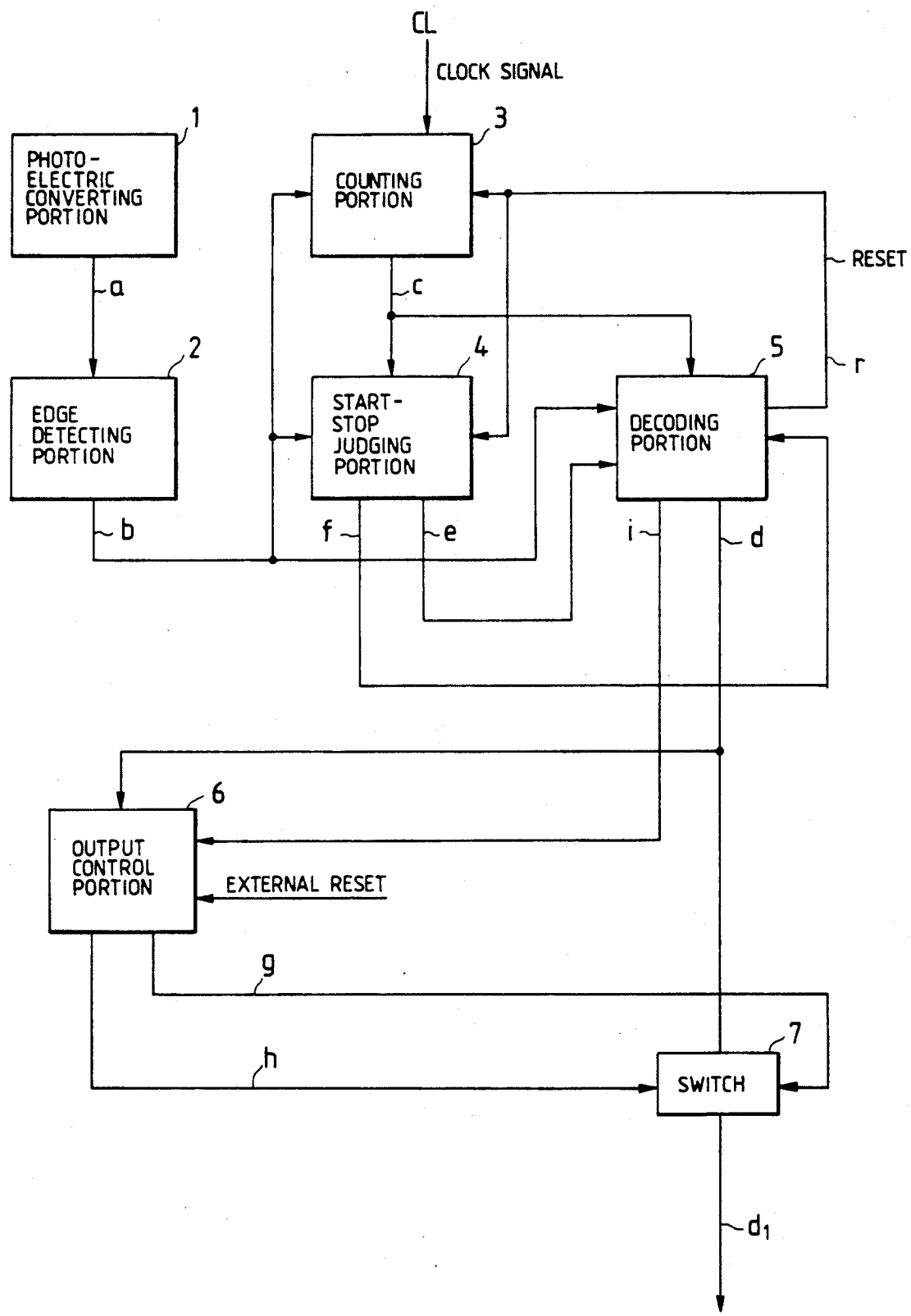
FIG. 1 is a block diagram of an embodiment of the code reading device including the first, second and fifth means of this invention.

FIG. 1 is a block diagram illustrating an embodiment of the code reading device according to this invention, in which reference numeral 1 is a photo-electric converting portion; 2 is an edge detecting portion; 3 is a counting portion; 4 is a start-stop judging portion; 5 is a decoding portion; 6 is an output control portion; and 7 is a switch.

In FIG. 1, the photo-electric converting portion 1 is provided with a self scanning type line sensor consisting of a series of photo-electric converting elements such as CCD, etc. a focusing optical system, a digitizer, etc., and photo-electrically converts a bar code displayed on a medium into a two-valued level signal a of "H" or "L", which is given to the edge detecting portion 2. The edge detecting portion 2 detects turning points of the two-valued level signal a of "H"→"L" or "L"→"H" and gives the counting portion 3, the start-stop judging portion 4 and the decoding portion 5 a detected signal as an edge detection signal b. The counting portion 3 is cleared by the input of the edge detection signal b and counts the number of clock signals CL coming from clock signal generating means (not shown in the figure) between two adjacent edge signals detected at the edge detecting portion 2. In this way, it gives the start-stop judging portion 4 and the decoding portion 5 a count signal c indicating the count value thereof.

The start-stop judging portion 4 detects the start code S shown in FIGS. 3a and 3b from the edge detection signal b and the count signal c, and gives the decoding portion 5 a signal f, when the start condition is not satisfied. Then, it detects the stop code S succeeding the message code inputted after the start code is encountered and gives the decoding portion 5 a signal e, when the stop condition is satisfied.

The decoding portion 5 receives the count value c from the counting portion 3 upon receiving the edge detection signal b and stores it. Then it executes a decoding operation when the signal e is received from the start-stop judging portion 4. When the decoding has been executed correctly, decoding portion 5 sends a signal i indicating the successful decoding to the output control portion 6 and at the same time sends data d representing the result of the decoding to the output control portion 6 and a switch 7. Further, when the signal f is inputted from the start-stop judging portion 4, the count value received from the counting portion 3 is cleared.

When the decoded data d (decoded data at the present time) coming from the decoding portion 5 differ from the last decoded data, the output control portion 6 gives the switch 7 the signal g and transmits the decoded data d stated above to an information processing device (not shown in the figure) after providing them as data d1. However, when the decoded data at the present time and the last decoded data are the same, output control portion 6 gives the switch 7 a signal h to inhibit transmission of the decoded data d at the present time to the information processing device.

Further, in the case where the decoding has been executed incorrectly in the decoding portion 5, a signal r indicating an unsuccessful decoding is given to the counting portion 3 and the start-stop judgment portion 4 to reset them. In addition, the output control portion 6 is reset by a signal inputted through an external reset line, responding to switch-on of the power source or an instruction signal coming from the information processing device.

FIG. 2 is a block diagram of the output control portion 6 in FIG. 1 in which 61 and 63 are switches; 62 is a first data memory storing decoded data at the present time; 64 is a second data memory storing the last decoded data; and 65 is a comparator which compares the data stored in the first data memory with those stored in the second data memory.

In FIG. 2, the switch 61 is turned-on by the signal i indicating a successful decoding and gives the first data memory 62 the decoded data d as input data d2. The first data memory 62 stores the input data d2 and gives the data comparator switch 65 and the switch 63 the stored data as output data d3.

The comparator 65 compares the data stored in the first data memory 62 with the data stored in the second data memory 64 and the switch 63 is turn-on by a signal g obtained as the result of the comparison and indicating that they are different and gives the second data memory 64 the present decoded data d3 stored in the first data memory 62 as the last data d4 for the succeeding data comparing processing.

The second data memory 64 stores the data inputted through the switch 63 as the last decoded data and gives them to the data comparator 65 as data d5 to be compared. Further, the memory content is cleared by a reset input from an external reset line.

The data comparator 645 compares the present decoded data d3 stored in the first data memory 62 with the last decoded data d5 stored in the second data memory 64 and outputs the signal g when they are not the same and a signal h when they are the same, as described previously.

The signals g and h stated above outputted according to the result of the comparison by means of the data comparator 65 are used as an ON/OFF signal for the switch 7, respectively, as explained. Referring to FIG. 1, the decoded data d (i.e. the present decoded data) from the decoded portion 5 are transmitted to an information processing device not shown in the figure as the decoded output data d1, only when the content d3 in the first data memory 62 and the content d4 in the second data memory 64 are not the same.

In this way, according to this embodiment, since the same read out data received multiple times from the photo-electric converting block are outputted only once to the information processing device at the point of time. When they are correctly decoded, the load on the information processing device side is reduced and the reading out probability is maintained.

Hereinbelow, a second embodiment of this invention including the second means will be explained in detail, referring to FIGS. 1, 3a 3b and 4.

Figure 4:
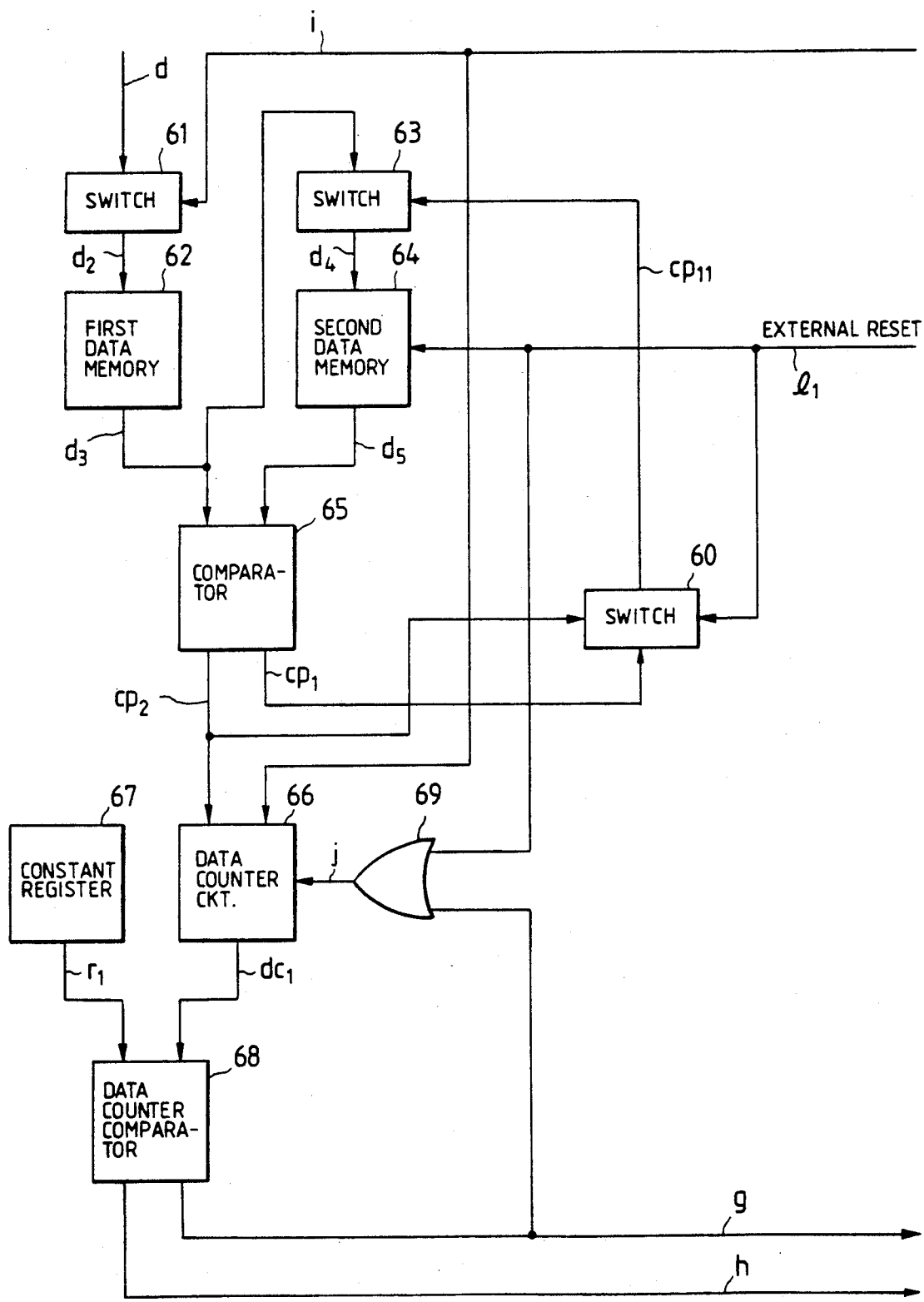
FIG. 4 is a block diagram of the principal part of the device shown in FIG. 1 including the second means of this invention.

FIG. 1 is a block diagram of the code reading device according to this invention and FIG. 4 is a block diagram of the output control portion 6 in FIG. 1 in this second embodiment.

The output control portion 6 of this second embodiment is shown in FIG. 4.

In FIG. 2, reference numerals 60, 61 and 63 are switches; 62 is a first data memory storing decoded data d3 at the present time; 64 is a second data memory storing the last decoded data d5; 65 is a comparator which compares the data d3 stored in the first data memory with the data d5 stored in the second data memory; 66 is a data counting circuit for counting the number of times dc1 where the two data are the same as the result of the comparison by means of the comparator 65; 67 is a constant register for setting the predetermined number of times $r_1$; and 68 is a data counter comparator comparing the output of the data counter 66 with the predetermined number of times given by the constant register 67.

As indicated in FIG. 4, the first data memory 62 is connected with the switch 61. This switch 61 is turned on by a signal i indicating a successful decoding and inputs the data d which are the result of the decoding into the first data memory 62 as input data d2. The first data memory 62 stores the inputted input data d2 and gives the comparator 65 and the switch 63 which are connected with the first data memory 62 output data d3.

The input terminal of the second data memory 64 is connected with the switch 63. The output terminal of this second data memory 64 and the output terminal of the first data memory 62 are connected with the input terminals of the comparator 65. Then, the output terminal of the switch 60 is connected with the switch 63 and when a signal CP11 is given from the switch 60 to the switch 63, the switch 63 is turned-on and data d3 corresponding to the output data d3 of the first data memory 62 are inputted from the switch 63 to the second data memory 64. In addition, when the switch 60 is in the OFF state and the signal CP11 is not outputted by the switch 60, the switch 63 does not input the data d4 in the second data memory 64.

When the data d4 is inputted into the second data memory 64, corresponding data d5 are inputted from the second data memory 64 to the comparator 65. In this comparator 65, these data d5 are compared with the output data d3 from the first data memory. As the result of this comparison, when the data d3 and the data d5 are the same, a signal CP2 is outputted from the comparator 65 and this signal CP2 is inputted in the data counter circuit 66 and the switch 60 stated above. As the result of the comparison by means of the comparator 65, when the data d3 and the data d5 are not the same, a signal CP1 is outputted from the comparator 65 and given to the switch 60.

In addition, a signal line $l_1$ is connected with the second data memory 64 and the switch 60. When a reset signal is inputted through this signal line $l_1$, the data stored in the second data memory are cleared and the switch 60 inputs the signal CP11 based on the signal CP1 in the switch 63 which is turned-on. In addition, when a signal CP2 is given from the comparator 65 to the switch 60, the switch 60 is in the OFF state.

Consequently, the comparator 65 compares the data d3 from the first data memory 62 with the data d5 from the second data memory 64. When the two data are the same, the signal CP11 is not outputted by the switch 60 and the switch 63 is in the OFF state.

The signal CP2 from the comparator 65 is inputted in the data counter circuit 66 and further the signal i indicating a successful decoding is inputted in the data counter circuit 66. For this reason, as long as the signal CP2 is inputted, the data counter circuit 66 counts the signal i indicating a successful decoding and its count-signal dc1 is inputted in the data counter comparator 68 connected with the data counter circuit 66.

A signal $r_1$ representing a predetermined number is inputted from the constant register 67 to the data counter comparator 68. The data counter 68 compares the count signal dc1 with the signal $r_1$ representing the predetermined number, and outputs the OFF signal h if $dc1 < r_1$ and the ON signal g, if $dc1 \geq r_1$. by means of this ON signal g the switch 7 in FIG. 1 is turned to the ON state and the data d representing the result of the decoding from the decoding portion 5 are transmitted from the switch 7 to the information processing device as the data d1. When the OFF signal h is given to the switch 7, since the switch 7 is turned to the OFF state, no data are transmitted from the decoding portion 5.

Furthermore, an OR circuit 69 is disposed. Since a reset signal from the signal line $l_1$ and the ON signal g stated above can be inputted in the input terminal of this OR circuit, when the data d outputted by the decoding portion 5 are the same as its immediate previous value consecutively for the predetermined number of times $r_1$, the data counter circuit 66 is reset and a new count begins. In addition, the data counter circuit 66 is reset also by the reset signal coming from the signal line $l_1$.

In this way, according to this second embodiment, when it is confirmed that the data d representing the result of the decoding outputted by the decoding portion 5 stayed unchanged the predetermined number of times (e.g. 10 times), the data d are transmitted to the information processing device. Thus, since a limited number of the data d is sent, the load of the information processing device is remarkably reduced and at the same time, because data d is confirmed a predetermined number of times, code reading can be effected correctly with a high reliability.

Hereinbelow a third embodiment of this invention including the third technical means will be explained in more detail referring to FIGS. 3a, 3b, 5 and 6.

Figure 5:
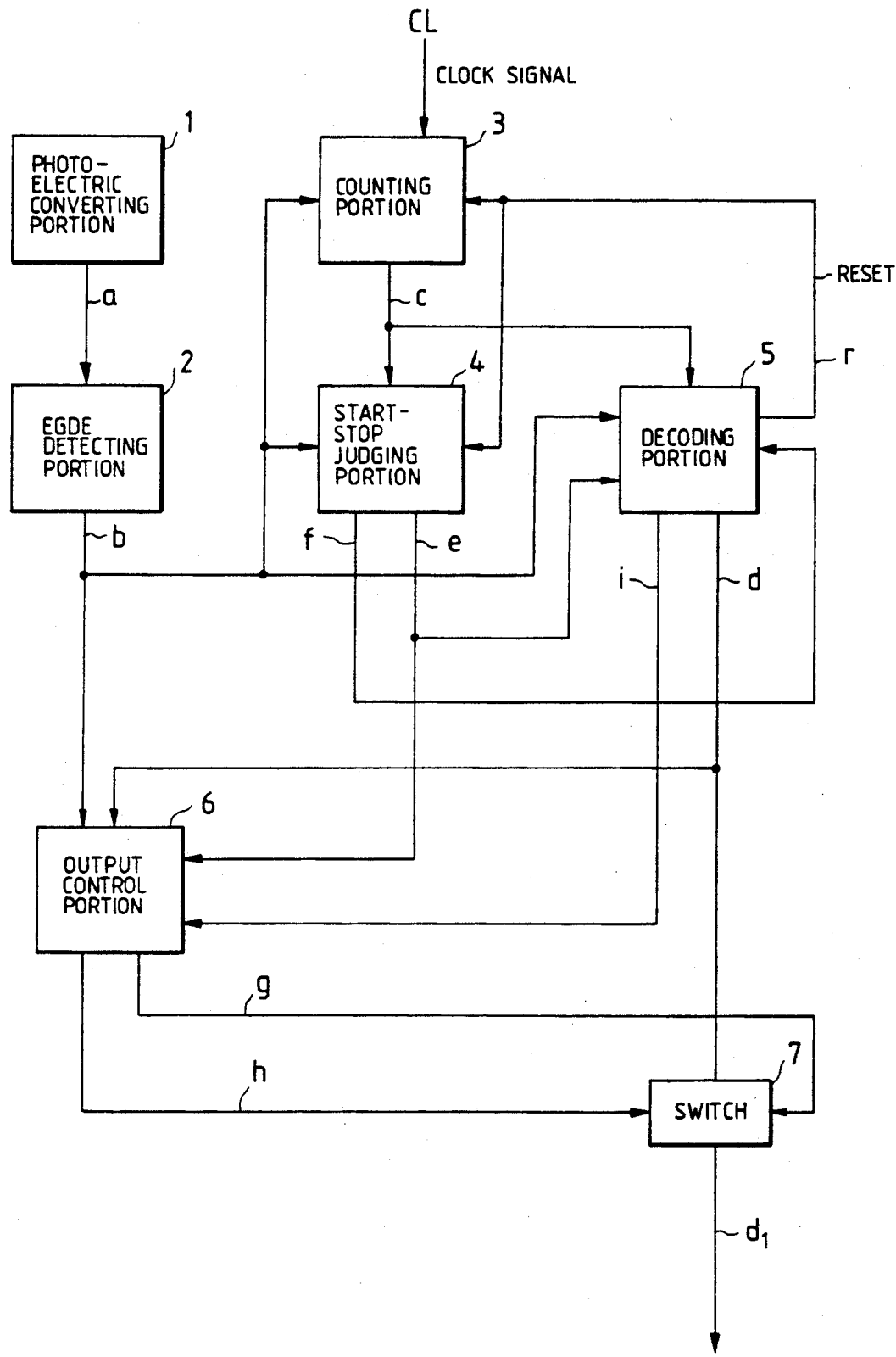
FIG. 5 is a block diagram of another embodiment of the code reading device including the third, fourth and sixth means of this invention.
Figure 6:
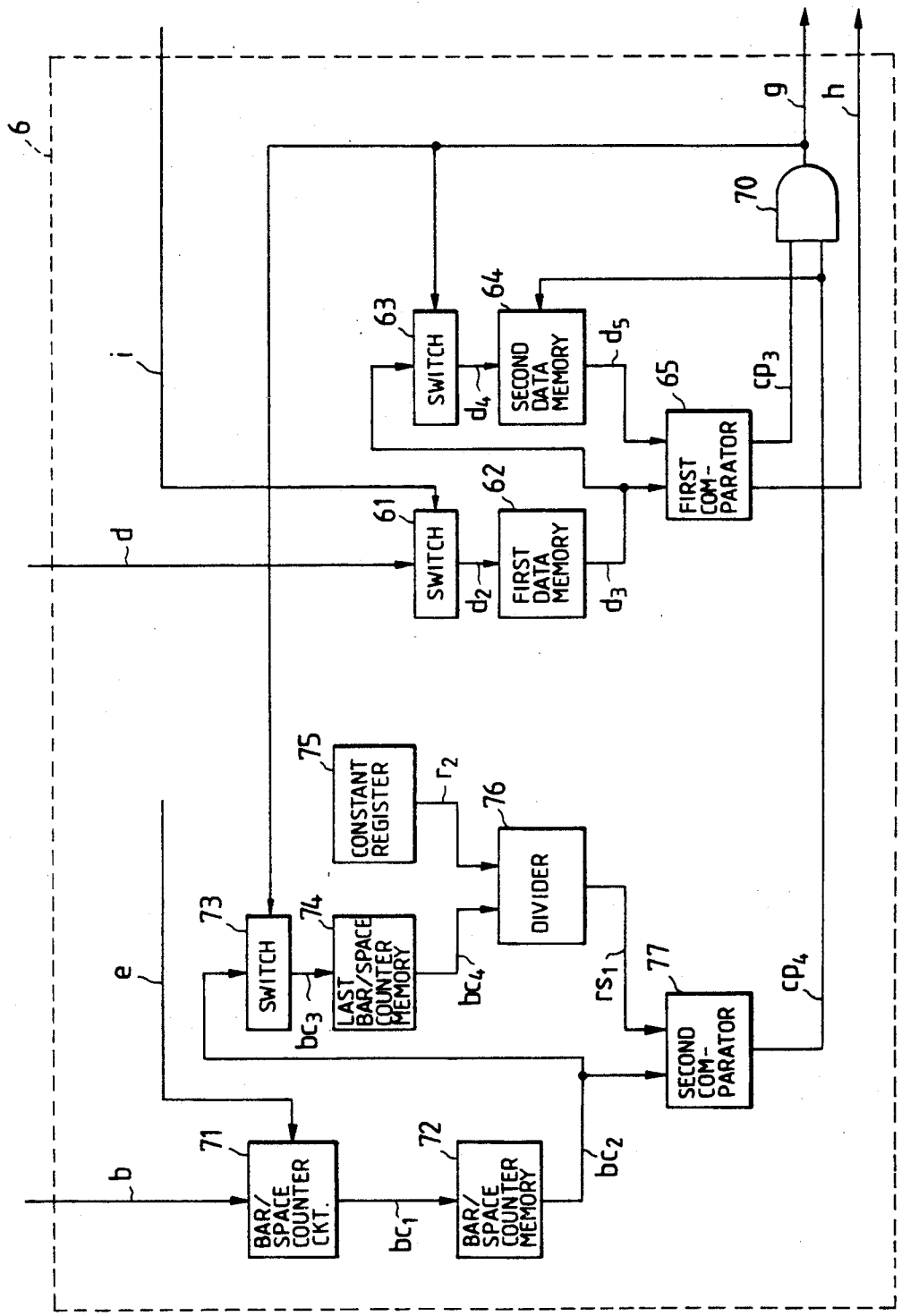
FIG. 6 is a block diagram of the principal part of the device shown in FIG. 5 including the third means of this invention.

FIG. 5 is a block diagram of the code reading device according to this invention and FIG. 6 is a block diagram of the output control portion in FIG. 5.

In FIG. 5, reference numeral 1 is a photo-electric converting portion; 2 is an edge detecting portion; 3 is a counting portion; 4 is a start-stop judging portion; 5 is a decoding portion; 6 is an output control portion; and 7 is a switch.

In FIG. 5, the photo-electric converting portion 1 is provided with a self scanning type line sensor consisting of a series of photo-electric converting elements such as CCD, etc., a focusing optical system, a digitizer, etc., and photo-electrically converts a bar code displayed on a medium into a two-valued level signal a of "H" or "L", which is given to the edge detecting portion 2. The edge detecting portion 2 detects turning points of the two-valued level signal a of "H"→"L" or "L"→"H" and give the counting portion 3, the start-stop judging portion 4 and the decoding portion 5 a detected signal as an edge detection signal b.

The counting portion 3 is cleared by the input of the edge detection signal b and counts a clock signal CL coming from clock signal generating means (not shown in the figure) between adjacent edge signals from the edge detecting portion 2 and gives the start-stop judging portion 4 and the decoding portion 5 a count signal c indicating the count value thereof.

The start-stop judging portion 4 detects the start code S shown in FIGS. 3a and 3b from the edge detection signal b and the count signal c, and gives the decoding portion 5 a signal f when the start condition is not satisfied. Then it detects the stop code S succeeding the message code inputted after the start code is encountered and gives the decoding portion 5 a signal e when the stop condition is satisfied.

The decoding portion 5 receives the count signal c from the counting portion 3 at the input of the edge detection signal b and effects decoding processing. When the decoding has executed correctly, decoding portion 5 gives the output control portion 6 a signal i indicating the successful decoding and at the same time supplies data d representing the result of the decoding to the output control portion 6 and a switch 7. In the case where the decoding has been executed incorrectly in the decoding portion 5, a signal r indicating an unsuccessful decoding is given to the counting portion 3 and the start-stop judgment portion 4 to reset them. In addition, the decoding portion 5 clears the counting signal c received from the counting portion 3 and stored, when the signal f is inputted from the start-stop judging portion 4.

When it is detected by the comparison by means of a first comparator 65 shown in FIG. 6 that data stored in a first data memory 62 differ from data stored in a second data memory 64 and it is detected by a second comparator 77 that the ratio of the number of bars and/or spaces to a predetermined value previously set is smaller than a predetermined value, the output control portion 6 transmits the data stored in the first data memory 62 as decoded data to the information processing device. When the two data are the same by the comparison by means of the first comparator 65, no data are transmitted to the information processing device.

The output control portion 6 is shown in FIG. 6 in which 61 and 63 are switches; 62 is a first data memory storing decoded data at the present time; 64 is a second data memory storing the last decoded data; 65 is a first comparator comparing the data stored in the first data memory 62 with the data stored in the second data memory 64; 71 is a bar/space counter circuit counting the edge signal b; 72 is a bar/space counter memory storing the count value in the bar/space counter circuit 71; 73 is a switch; 74 is a last bar/space counter memory storing the last count value in the bar/space counter memory 72; 75 is a constant register in which a predetermined value (>1) is set; 76 is a divider which divides the count value in the last bar/space counter memory 74 by the predetermined value set in the constant register 75; and 77 is a second comparator comparing the count value stored in the bar/space counter memory 72 with the value obtained by operation in the divider 76.

As shown in FIG. 6, the first data memory 62 is connected with the switch 61. This switch 61 is turned-on by a signal i indicating a successful decoding and inputs the data d, which are the result of the decoding, in the first data memory 62 as input data d2. The first data memory 62 stores the inputted input data d2 and gives the comparator 65 and the switch 63, which are connected with the first data memory 62, this stored data d2 as output data d3.

The second data memory 64 is connected with the output side of the switch 63 and the output terminal of the second data memory 64 as well as the output terminal of the first data memory 62 stated above are connected with the first comparator 65. An output terminal of the first comparator 65 as well as the output terminal of the second comparator 77 are connected with the input terminals of an AND circuit 70 and the output terminal of the AND circuit 70 is connected with switches 63 and 73. When an ON signal g is outputted by the AND circuit 70, the switches 63 and 73 are turned to the ON state.

When the switch 63 is turned in this way to the ON state, the data d3 of the first data memory 62 are inputted in the second data memory 64 as data d4 through the switch 63.

The data d4 stored in the second data memory are inputted in the first comparator 65 as the last decoded data d5. Then in the first comparator 65, these data d5 are compared with the present decoded data d3 inputted from the first data memory 62. As the result of this comparison, when the data d3 and the data d5 are the same, an OFF signal h is outputted by the comparator 65. In addition, when the data d3 and the data d5 are not the same in the comparison in the first comparator 65, a signal cp3 is given from the first comparator 65 to the AND circuit 70.

The bar/space counter circuit 71 counts the edge signal b coming from the edge detecting portion 2 which is given to the bar/space counter memory 72 connected with the bar/space counter circuit 71 as a count value bc1 and stored there. In addition, the second comparator 77 as well as the switch 73 are connected with the output of the bar/space counter memory 72 and the bar/space counter memory 72 gives the second comparator 77 and the switch 73 the stored count value bc1 as a signal bc2.

When this switch 73 is in the ON state, the signal bc2 from the switch 73 is given to the last bar/space counter memory 74 connected with the switch 73 as a signal bc3. The output terminal of this last bar/space counter memory 74 and the output terminal of the constant register 75 are connected with the two input terminals of the divider 76. Further, the output terminal of the divider 76 is connected with the input terminal of the second comparator 77 described previously and the output terminal of the second comparator 77 is connected with an input terminal of the AND circuit 70 stated above.

The output signal bc4 corresponding to the count value of the last bar/space counter memory 74 is divided by a predetermined value previously set in the constant register 75 by means of the divider 76 and the value rs1 obtained by this operation and the output signal bc2 of the bar/space counter memory 72 are compared with each other by means of the second comparator 77. When it is verified by this comparison that the output signal bc2 corresponding to the count value of the bar/space counter memory 72 is smaller than the value rs1 obtained by the divider 76, the second comparator 77 gives the AND circuit 70 a signal cp4. In this way, when the signals cp3 and cp4 are given to the AND circuit 70, an ON signal g is outputted by this AND circuit 70.

By this ON signal g the switches 63 and 73 are turned to the ON state and at the same time the switch 7 shown in FIG. 1 is also turned to the ON state. Thus the data d representing the result of the decoding by means of the decoding portion 5 are transmitted to the information processing device as the data d1 through the switch 7. When the OFF signal h is given to the switch 7, since the switch 7 is turned to the OFF state, no data are transmitted by the decoding portion 5. Further, in this embodiment, as long as the signal cp4 is not outputted by the second comparator 77, the ON signal g is not outputted by the AND circuit 70. In addition, when the signal cp4 is outputted by the second comparator 77, the data stored in the second data memory 64 are cleared.

Since it is the count value of bars and/or spaces at the successful decoding that is stored in the last bar/space counter memory 74, decrease in the count value of the bar/space counter circuit 71 to a value under a certain ratio previously determined means that the number of bars and/or spaces is extraordinary small. This can take place by reading out the number of clear spaces between bars and codes, e.g. in the case where bar codes arranged longitudinally with a certain interval are scanned continuously.

In this third embodiment the second data memory 64 is cleared and a new comparison operation is effected by receiving new memory data. In this way, a processing indicating that the information of the bar code has changed is effected. For this reason, it is possible to clarify distinction of information even if bar codes have a same structure.

Furthermore, in this third embodiment when the signal cp4 is outputted by the second comparator 77 since the data from the decoding portion 5 are transmitted to the information processing device, the load of the information processing device is remarkably reduced.

Although in the above, the device has been explained for the case where the data stored in the first data memory 62 and those stored in the second data memory 64 are different from each other, the first comparator 65 transmits the data in the first data memory to the information processing device and in addition, when the second comparator 77 detects that the ratio of the number of bars/spaces to the predetermined value is smaller than a certain value, the decoded data is transmitted to the information processing device as another information. This invention is not restricted to this third embodiment, but it may be so constructed that the second comparator 77 compares the numbers of bars and spaces Furthermore, it is possible also to construct it so that the data transmission is effected when a difference in data values is detected by the first comparator 65 and variation in the information are dealt with for every transmission apart from the data transmission by the detection signal obtained by the second comparator.

Hereinbelow, a fourth embodiment of this invention including the fourth means will be explained in more detail referring to FIGS. 3a, 3b, 5 and 7.

Figure 7:
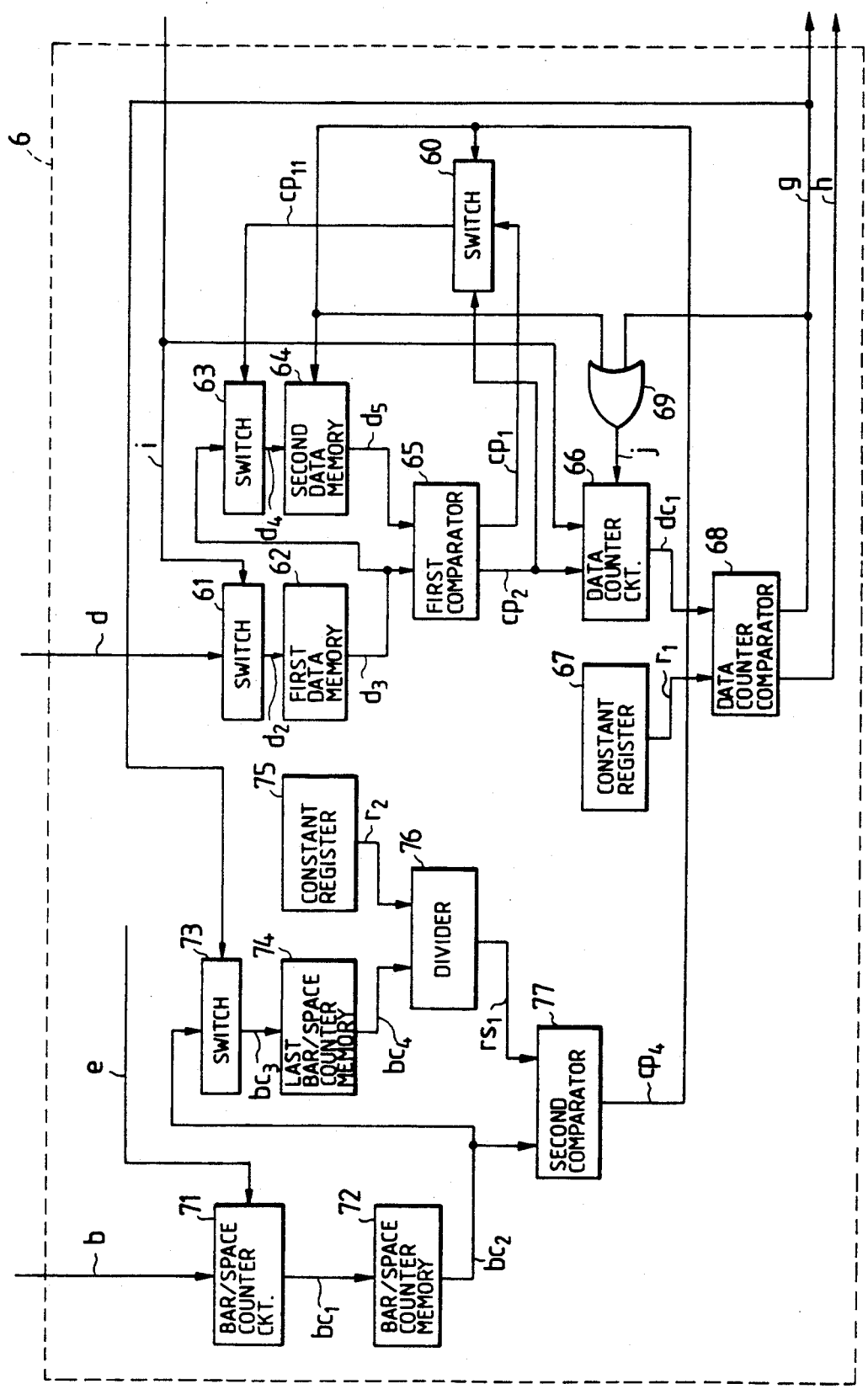
FIG. 7 is a block diagram of the principal part of the device shown in FIG. 5 including the fourth means of this invention.

FIG. 5 is a block diagram of the code reading device according to this invention and FIG. 7 is a block diagram of the output control portion in this fifth embodiment.

When the data d (FIG. 5) representing the result of the decoding supplied by the decoding portion 5 are data indicating that the two data are the same a predetermined number of times, the output control portion 6 gives the switch 7 the ON signal g to turn the switch 7 to the ON state and transmits the data d from the decoding portion 5 to the information processing device as the data d1. In this case, if the two data are the same a predetermined number of times, the switch is in the OFF state and the data a are not transmitted from the decoding portion 5 to the information processing device.

The output control portion 6 is shown in FIG. 7. In FIG. 7, reference numerals 60, 61 and 63 are switches; 62 is a first data memory storing decoded data at the present time; 64 is a second data memory storing the last decoded data; 65 is a first comparator comparing the data stored in the first data memory 62 with the data stored in the second data memory 64; 66 is a data counter circuit counting the number of times where the two data are the same as the result of the comparison by means of the comparator 65; 67 is a constant register for setting the predetermined number of times; and 68 is a data counter comparator comparing the output of the data counter 66 with the predetermined numbers of times given by the constant register 67. Further, in FIG. 7, 71 is a bar/space counter circuit counting the edge signal b; 72 is a bar/space counter memory storing the count value in the bar/space counter circuit 71; 73 is a switch; 74 is a last bar/space counter memory storing the last count value in the bar/space counter memory 72; 75 is a constant register in which a predetermined value (>1) is set; 76 is a divider which divides the count value in the last bar/space counter memory 74 by the predetermined value set in the constant register 75; and 77 is a second comparator comparing the count value stored in the bar/space counter memory 72 with the value obtained by operation in the divider 76.

As shown in FIG. 7, the first data memory 62 is connected with the switch 61. This switch 61 is turned-on by a signal i indicating a successful decoding and inputs the data d which are the result of the decoding in the first data memory 62 as input data d2. The first data memory 62 stores the inputted input data d2 and gives them to the comparator 65 and the switch 63 which are connected with the first memory 62 as the output data d3.

The second data memory 64 is connected with the output side of the switch 63 and the output terminal of the second data memory 64 as well as the output terminal of the first data memory 62 are connected with the first comparator 65. Further, the output terminal of the switch 60 is connected with the switch 63. When the signal cp11 is given from the switch to the switch 63, the switch is turned to the ON state and the output data d3 of the first data memory 62 is inputted from the switch 63 to the second data memory 64 as the last decoded data d4. In addition, when the switch 60 stated above is in the OFF state and the signal cp11 is not outputted by the switch 60, the switch 63 does not input the data d4 in the second data memory 64.

The data d4 stored in the second data memory 64 (last decoded data) are inputted in the comparator 65 as data d5 and these data (last decoded data) and the data d3 stored in the first data memory 62 (present decoded data) are compared with each other in the first comparator 65. As the result of this comparison, when the data d3 and the data 35 are in accordance with each other, the signal cp2 is outputted by the comparator 65, which signal is inputted in the data counter circuit 66 as well as the switch 60. In addition, as the result of the comparison by means of the first comparator 65, when the data d3 and the data d5 are not the same, the signal cp1 is outputted by the comparator 75 and inputted in the input terminal of the switch 60.

When the bar/space counter circuit 71 counts the edge signal b coming from the edge detecting portion 2 and a signal e coming from the start-stop judging portion 4 (FIG. 5), which indicates that the stop judging condition is fulfilled, is inputted, the count value bc1 is given to the bar/space counter memory 72 connected with the bar/space counter circuit 71 and stored there. In addition, the input terminal of the second comparator 77 as well as the input terminal of the switch 73 are connected with the output terminal of the bar/space counter memory 72 and the output signal bc2 corresponding to the count value bc1 is given to the second comparator 77 as well as the switch 73 by the bar/space counter memory 72.

When this switch 73 is in the ON state, the signal bc3 corresponding to the output signal bc2 from the switch 73 is given to the last bar/space counter memory 74 connected with the switch 73. The output terminal of this last bar/space counter memory 74 and the output terminal of the constant register 75 are connected with the two input terminals of the divider 76. Further, the output terminal of the divider 76 is connected with the input terminal of the second comparator 77 and the output terminal of the second comparator 77 is connected with the switch 60 and the second output data memory 64.

The count value (output signal bc4) stored in the last bar/space counter memory 74 is divided by a predetermined value previously set in the constant register 75 by means of the divider 76 and the value $rs_1$ obtained by this operation and the output signal bc2 of the bar/space counter memory 72 are compared with each other by means of the second comparator 77. When it is verified by this comparison that the count value (bc2) of the bar/space counter memory 72 is smaller than the value $rs_1$ obtained by the divider 76, a signal cp4 is inputted from the second comparator 77 to the switch 60 and the second output data memory 64. The switch 60 is turned to the ON state by this signal cp4 and the second output data memory 64 clears the data stored therein.

The data counter circuit 66 is connected with the first comparator 65 and the signal cp2 from the first comparator 65 is inputted in the data counter 66. Further, the signal i indicating a successful decoding is inputted in the data counter circuit 66. For this reason, the data counter circuit 66 counts the signal i indicating a successful decoding, as long as the signal cp2 is inputted therein and the count signal dc1 thereof is inputted in the data counter comparator 68.

A signal $r_1$ previously set indicates a predetermined number is inputted from the constant register 67 to the data counter comparator 68. The data counter comparator 68 compares the count signal dc1 with the signal $r_1$ and outputs the OFF signal h, if dc1<r1 and the ON signal g, if dc1≧r1. This ON signal g is given to the switch 73 which is turned to the ON state.

Further, owing to this ON signal, the switch 7 shown in FIG. 1 is turned to the ON state and the data d coming from the decoding portion 5, which represents the result of the decoding, are transmitted from the switch 7 to the information processing device as the data d1. When the OFF signal h is given to the switch 7, since the switch 7 is turned to the OFF state, no data from the decoding portion 5 are transmitted.

Furthermore, since the output terminal of an OR circuit 69 is connected with a data counter circuit 66 and the signal cp4 stated above as well as the ON signal g are connected with the two input terminals of the OR circuit 69, data d is outputted by the decoding portion 5 after no change for the predetermined number of times. The data counter circuit 66 is reset and begins a new count, if the count value counted by the bar/space counter circuit 71 is smaller than the value $rs_1$ obtained by the operation in the divider 76.

Since it is the count value of bars and spaces of the successful decoding that is stored in the last bar/space counter memory 74, decrease in the count value of the bar/space counter circuit 71 to a value under a certain ratio previously determined means that the number of bars and/or spaces is extraordinary small. This can take place e.g. in the case where bar codes arranged longitudinally with a certain interval are read out by scanning them continuously.

In this fourth embodiment, since the data counter circuit 66 begins a new count even if the next bar code is the same as the last bar code, it is still possible to distinguish the bar codes from each other.

Although, in the above, the device has been explained in which the numbers of bars and spaces are counted by the second comparators 77, this invention is not restricted thereto, but it may be so constructed that the bars or the spaces are counted.

In this way, according to this fourth embodiment, the bar codes are read out after having confirmed that the data d representing the result of the decoding outputted by the decoding portion 5 a predetermined number of times (e.g. 10 times). Further, the bar codes disposed at different position with intervals greater than a predetermined value can be dealt with, clearly distinguished and the data d thus obtained are transmitted to the information processing device. In this way, the data d are transmitted to the information processing device so that the load thereof is remarkably reduced and at the same time it is possible to read out the bar codes correctly with a high reliability while distinguishing automatically the bar codes disposed at different positions because the accordance of the data d is confirmed a predetermined number of times.

Hereinbelow the fifth embodiment of this invention including the fifth means will be explained in more detail referring to FIGS. 1, 3a, 3b and 8.

Figure 8:
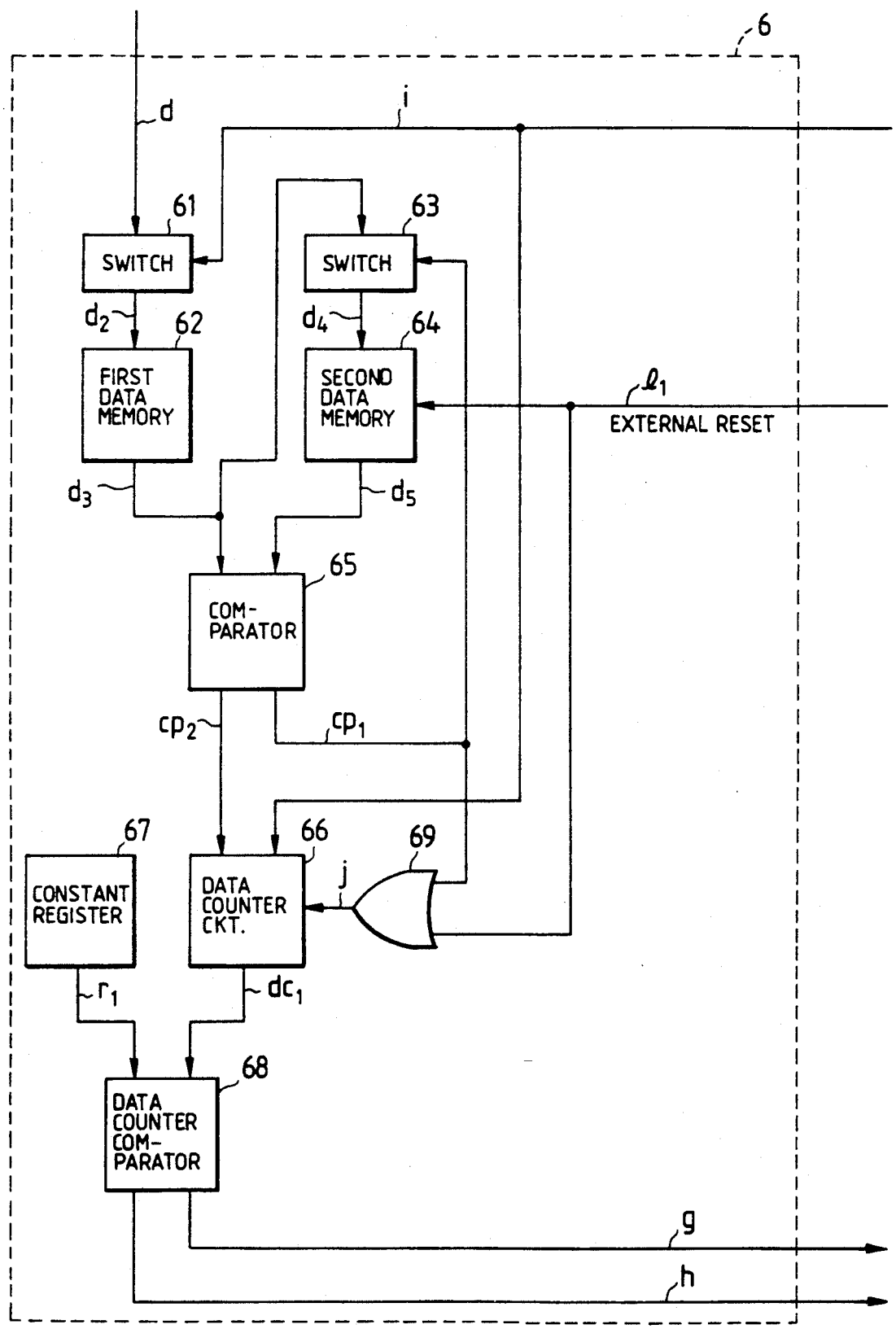
FIG. 8 is a block diagram of the principal part of the device shown in FIG. 1 including the fifth means of this invention.

FIG. 1 is a block diagram of the code reading device according to this invention and FIG. 8 is a block diagram of the output control portion 6 shown in FIG. 1.

The decoding portion 5 (FIG. 1) takes-in the count value c from the counting portion 3 by the input of the edge detection signal and stores it. Then it executes a decoding operation when the signal e is received from the start-stop judging portion 4. When the decoding has been executed correctly, decoding portion 5 sends a signal i indicating the successful decoding to the output control portion 6 and at the same time sends data d representing the result of the decoding to the output control portion 6 and a switch 7. In the case where the decoding has been executed incorrectly in the decoding portion 5 a signal r indicating an unsuccessful decoding is given to the counting portion 3 and the start-stop judgment portion 4 to reset them. In addition, the decoding portion 5 clears the counting signal c taken-in from the counting portion 3 and stored in the case where the signal f is inputted from the start-stop judging portion 4.

When the data d supplied by the decoding portion 5, which are the result of the decoding, remain to be the same data a predetermined number of times, the output control portion 6 gives the switch 7 an ON signal g to turn the switch 7 to the ON state and transmits the data d coming from the decoding portion 5 to the information processing device (not shown) as decoded data d1. In this case, unless the data d remain to be the same successively a predetermined number of times, the switch 7 is turned-off by the OFF signal h coming from the output control portion 6 and the transmission of the data from the decoding portion 5 to the information processing device is not effected.

For this reason, according to this fifth embodiment, the bar code is read out precisely under a stable reading but condition that the read out data d remain to be the same successively for a predetermined number of times and the decoded data obtained by decoding are transmitted to the information processing device so that the load of the information processing device is reduced.

In addition, the output control portion 6 is reset by a signal inputted through an external reset line responding to switch-on the power source or an instruction signal coming from the information processing device.

The output control portion 6 is shown in FIG. 8 in which 61 and 63 are switches; 62 is a first data memory storing decoded data at the present time; 64 is a second data memory storing the last decoded data; 65 is a comparator comparing the data stored in the first data memory with the data stored in the second data memory; 66 is a data counter circuit counting the number of times where the two data are the same in the comparison by means of the comparator 65; 67 is a constant register for setting a predetermined number of times; and 68 is a data counter comparator for comparing the output of the data counter 66 with the predetermined number of times in the constant register 67.

As indicated in FIG. 8, the first data memory 62 is connected with the switch 61. This switch 61 is turned to the ON state by a signal i indicating a successful decoding and inputs the data d, which are the result of the decoding, in the first data memory 62 as input data d2. The first data memory 62 stores the inputted input data d2 and gives the comparator 65 and the switch 63, which are connected with the first data memory 62, output data d3.

The input terminal of the second data memory 64 is connected with the switch 63 and the output terminal of this second data memory 64 as well as the output terminal of the first data memory 62 are connected with the input terminal of the comparator 65. In this comparator, the output data d3 of the first data memory 62 are compared with the output data d5 stored in the second data memory 64, in which the data d3 are stored through the switch 63 as data d4, and when the two data are the same, the result of the comparison is inputted in the data counter circuit 66 connected with the comparator 65. If the output data d3 and d5 are not the same in the comparison by means of the comparator 65, a signal cp1 from the comparator 65 is given to an OR circuit 69 and the switch 63. The switch 63 is turned to the ON state by this signal cp1. Thus the data stored in the first data memory 62 are stored in the second data memory 64 as data d4 and the output data d5 based on these data d4 are taken in the comparator 65 in which the comparison described previously is effected.

Since the signal i indicating a successful decoding is inputted in the data counter circuit 66, as far as the signal cp2 is inputted therein, the data counter circuit 66 counts the signal i indicating a successful decoding and the count signal dc1 thereof is inputted in the data counter comparator 68.

A signal $r_1$ representing the number of times previously set is inputted from the constant register 67 to the data counter comparator 68. The data counter 68 compares the count signal dc1 with the signal $r_1$ and outputs the OFF signal h if dc1<r1 and the ON signal g, if dc1≧r1. By means of this ON signal g the switch 7 in FIG. 1 is turned to the ON state and the data representing the result of the decoding from the decoding portion 5 are transmitted from the switch 7 to the information processing device as the data d1. When the OFF signal h is given to the switch 7, since the switch 7 is turned to the OFF state, no data are transmitted from the decoding portion 5.

Furthermore, since a reset signal from the signal line $l_1$ and the signal cp1 from the comparator 65 stated above are inputted in the input terminal of the OR circuit 69 when the two data are the same in the comparison by means of the comparator 65, the data counter circuit 66 is reset every time and a new count begins. For this reason, if the two data are not successively the same for a predetermined number of times, the ON signal g is not outputted by the comparator 68. The signal line $l_1$ is connected also with the second data memory 64 and thus the second data memory 64 as well as the data counter circuit 66 are reset by an external reset through the signal line $l_1$.

In this way, according to this fifth embodiment when it is confirmed that the data d representing the result of the decoding outputted by the decoding portion 5 are the same data for the predetermined number of times (e.g. 10 times), the data d (output d1 of the switch 7) are transmitted to the information processing device. Therefore, the load of the information processing device is remarkably reduced and at the same time the bar code is read out with a high precision under a stable reading out condition. Thus code reading is effected correctly with a high reliability.

Hereinbelow a sixth embodiment of this invention including the sixth means will be explained in more detail referring to FIGS. 3a, 3b, 5 and 9.

FIG. 5 is a block diagram of the code reading device according to this invention and FIG. 9 is a block diagram of the output control portion 6 in FIG. 5.

As will be stated below, when it is detected by the comparison by means of a data counter comparator 68 that the data stored in the first data memory 62 and those stored in the second data memory 64 are successively the same for a predetermined number of times, the data stored in the first data memory 62 are transmitted to the information processing device as decoded data. Unless the two data are the same for a predetermined number of times in the comparison by means of the data counter comparator 68, no data are transmitted to the information processing device.

The output control portion 6 is shown in FIG. 9 in which 61 and 63 are switches; 62 is a first data memory storing decoded data at the present time; 64 is a second data memory storing the last decoded data; 65 is a first comparator comparing the data stored in the first data memory 62 with the data stored in the second data memory 64; 66 is a comparator comparing the data stored in the first data memory 62 with the data stored in the second data memory 64; 67 is a constant register for setting the predetermined number of times; 68 is a data counter comparator comparing the output of the data counter 66 with the predetermined numbers of times given by the constant register 67; and 69 is an OR circuit. Further, in FIG. 9, 71 is a bar/space counter circuit counting the edge signal b; 72 is a bar/space counter memory storing the count value in the bar/space counter circuit 71; 73 is a switch; 74 is a last bar/space counter memory storing the last count value in the bar/space counter memory 72; 75 is a constant register in which a predetermined value (>1) is set; 76 is a divider which divides the count value in the last bar/space counter memory 74 by the predetermined value set in the constant register 75; and 77 is a second comparator comparing the count value stored in the bar/space counter memory 72 with the value obtained by operation in the divider 76.

As shown in FIG. 9, the first data memory 62 is connected with the switch 61. This switch 61 is turned-on by a signal i indicating a successful decoding and inputs the data d, which are the results of the decoding, in the first data memory 62 as input data d2. The first data memory 62 stores the inputted input data d2 and gives them to the comparator 65 and the switch 63, which are connected with the first data memory 62, as output data d3.

The second data memory 64 is connected with the switch 63 and the output terminal of the second data memory 64 as well as the output terminal of the first data memory 62 are connected with the comparator 65. One output terminal of the first comparator 65 is connected with the switch 63 and an input terminal of the OR circuit 69. When the signal cp1 is given from this one output terminal to the switch 63, this switch 63 is turned to the ON state, and thus the data d4 corresponding to the output data d3 from the first data memory 62 are inputted in the second data memory 64.

After the data d4 (data d3 from the first data memory 62) have been inputted in the second data memory 64 and stored as the last decoded data, these data d4 are inputted in the comparator 65 as data d5 and these data d5 (last decoded data) are compared with the output data d3 (present decoded data) from the first data memory 62 in the comparator 65. As the result of this comparison, when the data d3 and the data d5 are the same, the signal cp2 is outputted from another output terminal of the first comparator 65. This signal cp2 is given to the data counter circuit 66 connected with the comparator 65. As the result of the comparison, when the two data are not the same, the signal cp1 is outputted from one output terminal of the first comparator 65.

The one output terminal of the first comparator 65 is connected with one input terminal of the OR circuit 69, as stated previously and the output terminal of this OR circuit 69 is connected with the data counter circuit 66. For this reason, when the two data are not the same in the comparison by means of the first comparator 65 and the signal cp1 is outputted, a signal j is given to the data counter circuit 66 by the OR circuit 69 and the data counter circuit 66 is reset by this signal j.

Further, since the signal i indicating a successful decoding is inputted in the data counter circuit 66, as long as the signal cp2 is inputted, the data counter circuit 66 counts successively the signal i indicating a successful decoding and the count signal dc1 thereof is inputted in the data counter comparator connected with the data counter circuit 66.

A signal $r_1$ representing a predetermined number previously set is inputted from the constant register 67 to the data counter comparator 68. The data counter 68 compares the count signal dc1 with the signal $r_1$ and outputs the OFF signal h if $dc1 < r_1$ and the ON signal g, if $dc1 \geq r_1$. By means of this ON signal g the switch 7 in FIG. 5 is turned to the ON state and the data d representing the result of the decoding from the decoding portion 5 are transmitted from the switch 7 to the information processing device as the data d1. When the OFF signal h is given to the switch 7, since the switch is turned to the OFF state, no data are transmitted from the decoding portion 5.

Since the data counter circuit 66 is reset unless the two data are the same in the comparison by means of the first comparator, the data counter comparator 68 outputs the ON signal g, in the case where the output data d3 of the first data memory 62 and the data d5 of the second data memory 64 are the same successively for a predetermined number of times (e.g. 10 times) set previously.

The bar/space counter circuit 71 counts the edge signal b from the edge detecting portion 2 in FIG. 5. When a signal e, indicating that the stop judging condition is fulfilled, is inputted from the start-stop judging portion 4, the count value bc1 is given to the bar/space counter memory 72, which is connected with the bar/space counter 77 and the switch 73. The bar/space counter memory 72 provides the output signal bc2, corresponding to the count value bc1, to the second comparator 77 and the switch 73. When the ON signal g is given from the data counter comparator 68 stated previously to this switch 73, the switch 73 is turned to the ON state and the output signal bc2 of the bar/space counter memory 72 is given to the last bar/space counter 74 as the signal bc3.

The output terminal of this last bar/space counter memory 74 and the output terminal of the constant register 75 are connected with the two input terminal of the divider 76 and the output terminal of this divider 76 is connected with the input terminal of the second comparator 77. Further, the output terminal of the second comparator 77 is connected with the input terminal of the OR circuit 69 described previously.

The output signal bc4 corresponding to the counter of the last bar/space counter memory 74 is divided by the predetermined value previously set by means of the divider 76 and the value $rs_1$ obtained by this operation and the output signal bc2 of the bar/space counter memory 72 are compared with each other by means of the second comparator 77. If, in this comparison, the output signal bc2, corresponding to the count value of the bar/space counter memory 72, is smaller than the value $rs_1$ obtained by the operation in the divider 76, the signal cp4 is given from the second comparator 77 to the OR circuit 69 and the second data memory 64.

Since a signal j is give by this signal cp4 from the OR circuit 69 to the data counter circuit 66, the data counter circuit 66 is reset and at the same time the second data memory 64 is cleared.

Since it is the count value of bars and/or spaces at the successful decoding that is stored in the last bar/space counter memory 74, decrease in the count value of the bar/space counter circuit 71 to a value under a certain ratio previously determined means that the number of bars and/or spaces is extraordinary small. This can take place by reading out the number of clear spaces between bars and codes, e.g. in the case where bar codes arranged longitudinally with a certain interval are scanned continuously.

In this sixth embodiment the second data memory 64 is cleared, the data counter circuit 66 is reset, and a new comparison operation is effected by receiving new memory data. In this way, a processing indicating that the information of the bar code has changed is effected. For this reason, it is possible to clarify distinction of information even if bar codes having the same structure are encountered in succession.

In this way, according to this invention, reading out is effected with a high precision without erroneous decoding under a stable reading out condition that the data d representing the result of the decoding outputted by the decoding portion 5 is unchanged successively for a predetermined number of times (e.g. 10 times) and bar codes disposed at different positions with certain intervals are distinguished and transmitted to the information processing device as the data d1 even if the successive bar codes have the same structure.

For this reason, the data d1 are transmitted to the information processing device so that the load thereof is remarkably reduced, and at the same time it is possible to effect reading out of bar codes with a high reliability while distinguishing automatically bar codes disposed at different positions because the accordance of the data d is confirmed a predetermined number of times.

Furthermore, although this invention has been explained, supposing that the second comparator 77 counts the number of bars and/or spaces, this invention is not restricted thereto, but it may be so constructed that the bars or the spaces are counted.

As explained above, this invention using various means has the following effects.

According to the first means of this invention, a code reading device is provided in which code reading is effected by scanning a bar code several tends to several hundreds of times by means of a self scanning type photo-electric converter; only one set of correct data is transmitted to an information processing device with a high correct reading out probability and the load on the information processing device side is remarkably reduced.

Further, according to the second means of this invention, a code reading device is provided in which code reading is effected by scanning a bar code several tens to several hundreds of times by means of a self scanning type photo-electric converter; by verifying read out data a predetermined number of times, it is possible to effect correct and reliable code reading, and at the same time, reduce the load on the information processing device side.

Still further, according to the third means of this invention, a code reading device is provided in which code reading is effected by scanning a bar code several tens to several hundred of times by means of a self scanning type photo-electric converter; data can be transmitted without wasting resources of the information processing device and, at the same time, bar codes located at different display positions can be transmitted and dealt with, as different information, distinguished from each other, even if they have the same code structure. Summing and processing or analysis operation of information using bar codes can be effected efficiently.

Still further, according to the fourth means of this invention, a code reading device is provided in which code reading is effected by scanning a bar code several tens to several hundreds of times by means of a self scanning type photo-electric converter; data are transmitted in such a manner that the load on the information processing device side is reduced. In addition, since reading out of bar codes is effected after having confirmed the data a predetermined number of times, reading out operation can be effected correctly and reliably. In addition, since bar codes located at different display positions can be transmitted and dealt with, as different information, distinguished form each other, even if they have the same code structure, summing and processing or analysis operation of information using bar codes can be effected efficiently.

Still further, according to the fifth means of this invention, a code reading device is provided in which code reading is effected by scanning a bar code several tens to several hundreds of times by means of a self scanning type photo-electric converter. Bar codes are read out precisely and decoded correctly under a stable reading out condition and data representing the result of the decoding are transmitted to the information processing device only a necessary and sufficient number of times. In this way, it is possible to read out and deal with bar codes with high precision and at the same time to reduce the load of the information processing device.

Still further, according to the sixth means of this invention, a code reading device is provided in which code reading in effected by scanning a bar code several tens to several hundreds of times by means of a self scanning type photo-electric converter. Data are transmitted in such a manner that the load on the information processing device side is reduced. Furthermore, bar codes are read out precisely and correctly under a stable reading out condition and the read out data is verified a predetermined number of times. In addition, since bar codes located at different display positions can be transmitted and dealt with, as different information, distinguished from each other, even if they have the same code structure, summing and processing or analysis operation of information using bar codes can be effected efficiently.

What is claimed is:

1. A bar code scanning device, comprising:
   means for generating clock signal signals;
   means for performing repeated scans on a bar code presented to said scanning device, and for providing a set of transitions in an electrical signal corresponding to edges between bars and spaces encountered in each scan;

means receiving in each of said repeated scans said electrical signal and said clock signals for detecting said transitions in said electrical signal and for providing successive time interval values each equalling the number of said clock signals received between corresponding successive transitions in said electrical signals;

means receiving in each of said repeated scans said successive time interval values for detecting that a bar code is scanned whenever a subset of said time interval values in said scan demarcates bar code data, and for providing a decoded value for said bar code detected and asserting a successful decode signal;

first memory means, receiving said decoded value from said means for providing a decoded value, for storing said decoded value as a most recent decoded value, said first memory means storing said decoded value whenever said successful decode signal is asserted;

second memory means, receiving said most recent decoded value from said first memory means, for storing said most recent decoded value of said first memory means as a second most recent decoded value, said second memory means storing said most recent decoded value received in accordance with a control signal;

a comparator, receiving and comparing said most recent decoded value from said first memory means and said second most recent decoded value from said second memory means, for asserting said control signal whenever said second most recent decoded value and said decoded value received are compared different;

means for providing as output value of said bar code scanning device said most recent decoded value when said most recent decoded value and said second most recent decoded value are compared by said comparator to be the same for a predetermined number of times said successful decode signal is asserted.

2. A bar code reading device, comprising:

means for receiving a generating clock signals;

a photoelectric converting means for performing repeated scans on a bar code presented to said reading device and converting edges between the bars and spaces in each of said repeated scans into a set of transitions in an electrical signal;

edge detecting means receiving in each of said repeated scans said electrical signal for detecting said transitions and for providing, for every transition detected in said electrical signal, a corresponding transition in an edge detection signal;

counter means receiving in each of said repeated scans said clock signals and said edge detection signal for providing a series of counts, each count provided in accordance with the number of said clock signals received between successive transitions of said edge detection signal;

decoding means, receiving in each of said repeated scans said series of counts and said edge detection signal, for detecting a bar code whenever a subset of said series of counts received demarcates bar code data, for decoding said bar code detected, in accordance with said series of counts and said edge detection signal, and upon successfully decoding said bar code detected, for providing a decoded value of said bar code and asserting a successful decode signal;

first memory means receiving said decoded value from said decoding means and said successful decode signal for storing said decoded value received when said successful decode signal is asserted, said first memory means providing a first output value representing the stored content of said first memory means;

second memory means receiving a first control signal and said first output value of said first memory means for storing said first output value when said first control signal is received in an asserted state, said second memory means providing a second output value representing the stored content of said second memory means;

comparator means, receiving said first output value and said second output values value, for comparing said first output value and said second output values value, said comparator means asserting said first control signal when said first output value and said second output values value are different, said comparator means asserting a second control signal when said first output value and said second output values value are the same; and output means, receiving each decoded value of said decoding means and said first and second control signals, for outputting the decoded value of said decoding means when said first control signal is asserted and for inhibiting output of said decoded value when said second control signal is asserted.

3. A device as in claim 2, further comprising:

start-stop means receiving a reset signal, said edge detection signal and said series of counts for detecting a pair of start and stop codes in each of said repeated scans, said start-stop means is initialized to detect said start code when said reset signal is in an asserted state, said start-stop means asserting a code normal signal when both said start and stop codes are detected, and asserting a code fail signal when at least one of said start and stop codes is not detected; wherein, said decoding means receives said code normal and code fail signals, said decoding means asserting said successful decode signal upon successfully decoding said bar code and receiving said asserted code normal signal, said decoding means asserting said reset signal after decoding said bar code, regardless of whether said decoding is successful, and said counter means also receives said reset signal and initializes said count to zero whenever said reset signal is asserted.

4. A device as in claim 3, wherein said first memory means further comprises:

first memory control means receiving said decoded values from said decoding means and said successful decode signal for providing said first output value when said successful decode signal is asserted; and a first data memory receiving said first output value from said first memory control means for storing said first output value.

5. A device as in claim 4, wherein said second memory means further comprises:

second memory control means receiving said first control signal and said first output value, for providing said second output value when said first control signal is asserted; and a second data memory receiving said second output value from said second memory control means for storing said second output value.

6. A device as in claim 5, wherein said second data memory also receives said reset signal, said second data memory is cleared when said reset signal is asserted.

7. A bar code reading device, comprising:

means for generating clock signals;

a photoelectric converting means for performing repeated scans on a bar code presented to said reading device and converting edges between the bars and spaces in each of said repeated scans into a set of transitions in an electrical signal;

edge detecting means, receiving in each of said repeated scans said electrical signal, for detecting said transitions and for providing, for every transition detected in said electrical signal, a corresponding transition in an edge detection signal;

first counter means, receiving in each of said repeated scans said clock signals and said edge detection signal, for providing a series of counts, each count provided in accordance with the number of said clock signals received between successive transitions of said edge detection signal;

decoding means, receiving in each of said repeated scans said series of counts and said edge detection signal, for detecting a bar code scan whenever a subset of said series of counts received demarcates bar code data, for decoding said bar code detected, in accordance with said series of counts and said edge detection signal, and upon successfully decoding said bar code, for providing a decoded value of said bar code and asserting a successful decode signal;

first memory means, receiving said decoded value from said decoding means and said successful decode signal, for storing said decoded value received when said successful decode signal is asserted, said first memory means providing a first output value representing the value stored in said first memory means;

second memory means receiving an external reset signal, first and second control signals, and said first output value for storing said first output value when said first control signal is received in an asserted state, unless said second control signal is received in an asserted state after initialization and prior to receiving said asserted first control signal, said second memory means being initialized when receiving said external reset signal in an asserted state, and for providing a second output value representing the value stored in said second memory means;

comparator means, receiving said first output value and said second output value, for comparing said first output value and said second output value, said comparator means asserting said first control signal when said first output value and said second output value are different, said comparator means asserting a second control signal when said first output value and said second output value are the same;

second counter means, receiving said second control signal, a third control signal and said external reset signal, for providing as an assertion count the number of times said second control signal is asserted after either said external reset signal or said third control signal is received in an asserted state;

judging means for asserting said third control signal when said assertion count is not less than said predetermined number and asserting a fourth control signal when said assertion count is less than said predetermined number; and output means, receiving each decoded value of said decoding means and aid third and fourth control signals, for outputting said decoded value when said third control signal is asserted and for inhibiting output of said decoded value when said fourth control signal is asserted.

8. A device as in claim 7, wherein said comparator means also receives said external reset signal, said comparator means comprises:

a comparator for comparing said first and second output values, said comparator asserting an internal signal when said first and second output values are different and asserting said second control signal when said first and second output values are the same; and comparator control means for asserting, after said external reset signal is received in an asserted state, said first control signal in response to said asserted internal signal, and for preventing said first control signal to be asserted after said second control signal is asserted at least once, until said asserted external reset signal is received.

9. A device as in claim 7, wherein said second counter means comprises:

a counting circuit receiving said second control signal and an internal reset signal for maintaining said assertion count, said second count being initialized to zero when said internal reset signal is received in an asserted state; and counter control means for asserting said internal reset signal in response to said asserted external reset signal or said asserted third control signal.

10. A device as in claim 7, wherein said judging means comprises:

register means for storing said predetermined number; and data comparator means for comparing said predetermined number and said assertion count, said data comparator means asserting said third control signal when said assertion count is not less than said predetermined number and asserting said fourth control signal when said assertion count is less than said predetermined number.

11. A bar code reading device, comprising:

means for generating clock signals;

a photoelectric converting means for performing repeated scans on a bar code presented to said reading device and converting edges between the bars and spaces in each of said repeated scans into a set of transitions in an electrical signal;

edge detecting means, receiving in each of said repeated scans said electrical signal, for detecting said transitions and for providing, for every transition detected in said electrical signal, a corresponding transition in an edge detection signal;

first counter means, receiving in each of said repeated scans said clock signals and said edge detection signal, for providing a series of counts, each count provided in accordance with the number of said clock signals received between successive transitions of said edge detection signal;

start-stop means, receiving a reset signal, said edge detection signal and said series of counts, for detecting in each bar code scanned a pair of start and stop codes, said start-stop means is initialized to detect said start code when said reset signal is in an asserted state, said start-stop means asserting a code normal signal when both said start and stop codes are detected, and asserting said code fail signal when at least one of said start and stop codes is not detected;

decoding means, receiving said code normal and code fail signals, said series of counts and said edge detection signal, for decoding said bar code in each detected bar code scan in accordance with said series of counts, said code normal and code fail signals and said edge detection signal, and upon successfully decoding said bar code, for providing a decoded value of said bar code and asserting a successful decode signal, and for asserting said reset signal whenever a decoding is incorrectly executed;

first memory means, receiving said decoded value from said decoding means and said successful decode signal, for storing said decoded value received when said successful decode signal is asserted, said first memory means providing a first output value representing the stored content of said first memory means;

second memory means, receiving first and second control signals and said output value of said first memory means, for storing said output value when said first control signal is received in an asserted state, said second memory means cleared by said second control signal received in an asserted state, said second memory means providing a second output value representing the stored content of said second memory means;

comparator means, receiving said first output value and said second output value, for comparing said first output value and said second output value, said comparator means asserting a third control signal when said first output value and aid second output value are different, said comparator means asserting a fourth control signal when said first output value and said second output value are the same;

switch means for receiving said second, third and fourth control signals for providing said third signal as said first control signal from the time said second control signal is received in an asserted state to the time said fourth control signal is received in an asserted state;

second counter means, receiving said second, third, and fourth control signals and a fifth control signals, for providing an assertion count equal to the number of times said fourth control signal is received in an asserted state since the last time said second control signal is received in an asserted state, said assertion count is initialized to zero when either said second control signal or said fifth control signal is received in an asserted state;

judging means, receiving said assertion count, for asserting said fifth control signal when said second count is not less than a predetermined number, and asserting a sixth control signal when said assertion count is less than said predetermined number; and output means, receiving each decoded value of said decoding means and said fifth and sixth control signals, for outputting said decoded value when said fifth control signal is asserted and for inhibiting output of said decoded value when said sixth control signal is asserted.

12. A bar code reading device, comprising:

means for generating clock signals;

a photoelectric converting means for performing repeated scans on a bar code presented to said reading device and converting edges between the bars and spaces in each of said repeated scans into a set of transitions in an electrical signal;

edge detecting means, receiving in each of said repeated scans said electrical signal, for detecting said transitions and for providing, for every transition detected in said electrical signal, a corresponding transition in an edge detection signal;

first counter means, receiving in each of said repeated scans said clock signals and said edge detection signal, for providing a series of counts, each count provided in accordance with the number of said clock signals received between successive transitions of said edge detection signal;

decoding means, receiving in each of said repeated scans said series of counts and said edge detection signal for detecting that a bar code is scanned whenever a subset of said series of counts received demarcates bar code data, for decoding, in each bar code scanned, said bar code detected in accordance with said series of counts and said edge detection signal, and upon successfully decoding said bar code, for providing a decoded value of said bar code and asserting a successful decode signal;

first memory means, receiving said decoded value from said decoding means and said successful decode signal, for storing said decoded value received when said successful decode signal is asserted, said first memory means providing a first output value representing the stored content of said first memory means;

second memory means, receiving a first control signal and said output value of said first memory means, for storing said output value when said first control signal is received in an asserted state, said second memory means providing a second output value representing the stored content of said second memory means;

comparator means, receiving said first output value and said output value, for comparing said first output value and said second output value, said comparator means asserting said first control signal when said first output value and said second output value are different, said comparator means asserting a second control signal when said first output value and said second output value are the same;

second counter means, receiving said first and second control signals, for providing an assertion count equal to the number of times said second control signal is received in an asserted state since the last time said first control signal is received in an asserted state;

judging means, receiving said assertion count, for asserting a third control signal when said second count is not less than a predetermined number, and asserting a fourth control signal when said assertion count is less than said predetermined number; and output means, receiving each decoded value of said decoded means and said third and fourth control signals, for outputting said decoded value when said third signal is asserted and for inhibiting output of said decoded value when said fourth control signal is asserted.

13. A device as in claim 12, wherein said second counter means also receives an external reset signal, said second counter means further comprises reset circuit for initializing said second count to zero when either said first control signal or said external reset signal is received in an asserted state.

* * * * *